(12) United States Patent
Schneider et al.

(10) Patent No.: US 10,408,959 B2
(45) Date of Patent: Sep. 10, 2019

(54) MARINE SEISMIC SURVEYING WITH TOWED COMPONENTS BELOW WATER'S SURFACE

(71) Applicant: ION Geophysical Corporation, Houston, TX (US)

(72) Inventors: Curt Schneider, Katy, TX (US); Timothy A. Dudley, Houston, TX (US)

(73) Assignee: ION GEOPHYSICAL CORPORATION, Houston, TX (US)

( * ) Notice: Subject to any disclaimer, the term of this patent is extended or adjusted under 35 U.S.C. 154(b) by 72 days.

(21) Appl. No.: 15/676,839

(22) Filed: Aug. 14, 2017

(65) Prior Publication Data

US 2017/0363761 A1 Dec. 21, 2017

Related U.S. Application Data

(63) Continuation of application No. 14/339,726, filed on Jul. 24, 2014, now Pat. No. 9,766,360, and a
(Continued)

(51) Int. Cl.
*G01V 1/38* (2006.01)
*B63B 3/38* (2006.01)
*B63B 21/66* (2006.01)

(52) U.S. Cl.
CPC .............. *G01V 1/3843* (2013.01); *B63B 3/38* (2013.01); *B63B 21/66* (2013.01); *G01V 1/3826* (2013.01); *B63B 2211/06* (2013.01)

(58) Field of Classification Search
CPC ........ G01V 1/3843; B63B 3/38; B63B 21/66; B63B 2211/06
See application file for complete search history.

(56) References Cited

U.S. PATENT DOCUMENTS 1,625,245 A 4/1927 Grove
1,690,578 A 11/1928 Hammond, Jr.
(Continued)

FOREIGN PATENT DOCUMENTS

EP 0154968 9/1985
FR 2496277 6/1982
(Continued)

OTHER PUBLICATIONS

First Examination Report in counterpart DK Appl. PA 2017 70138, dated Nov. 3, 2017, 8-pgs.
(Continued)

*Primary Examiner* — Ian J Lobo
(74) *Attorney, Agent, or Firm* — Blank Rome LLP (57) ABSTRACT

A skeg mounts from the stern of a towing vessel and extends below the waterline. A channel in the skeg protects cables for steamers and a source (e.g., air gun array) of a seismic system deployed from the vessel. Tow points on the skeg lie below the water's surface and connect to towlines to support the steamers and the source. A floatation device supports the source and tows below the water's surface to avoid ice floes or other issues encountered at the water's surface. Seismic streamers have head floats supporting the streamers. Each of the floats has adjustable buoyancy preconfigured to counterbalance the weight in water of the towed component that the float supports. Acoustic signals from a transceiver at the vessel find locations of the towed components. A towed fish at a lower level than the towed components also uses acoustic signals with a transceiver to further refine the locations of the towed components.

20 Claims, 6 Drawing Sheets

Related U.S. Application Data continuation of application No. 14/216,935, filed on Mar. 17, 2014, now Pat. No. 9,933,536.

(56) References Cited

U.S. PATENT DOCUMENTS

| | | |
|---|---|---|
| 2,030,768 A | 2/1936 | Shultz |
| 2,462,568 A | 2/1949 | Steckel |
| 2,556,423 A | 6/1951 | Gross |
| 2,566,029 A | 8/1951 | Louthan |
| 2,692,570 A | 10/1954 | Costa |
| 2,765,565 A | 10/1956 | Mussio |
| 3,034,471 A | 5/1962 | Aschinger |
| 3,159,806 A | 12/1964 | Piasecki |
| 3,172,510 A | 3/1965 | Lee et al. |
| 3,336,572 A | 8/1967 | Paull et al. |
| 3,354,658 A | 11/1967 | Sam |
| 3,437,987 A | 4/1969 | Burg |
| 3,497,869 A | 2/1970 | Silverman |
| 3,583,445 A | 6/1971 | Harbonn et al. |
| 3,605,668 A | 9/1971 | Morgan |
| 3,621,380 A | 11/1971 | Barlow, Jr. |
| 3,635,186 A | 1/1972 | German |
| 3,703,876 A | 11/1972 | Michelsen |
| 3,739,736 A | 6/1973 | Carreau et al. |
| 3,744,014 A | 7/1973 | Greenlaw |
| 3,810,081 A | 5/1974 | Rininger |
| 3,886,882 A | 6/1975 | Thornburg et al. |
| 3,935,829 A | 2/1976 | Lantz |
| 4,004,265 A | 1/1977 | Woodruff et al. |
| 4,033,277 A | 7/1977 | Schaper |
| 4,037,189 A | 7/1977 | Bell et al. |
| 4,047,579 A | 9/1977 | Wilckens et al. |
| 4,124,990 A | 11/1978 | Bell et al. |
| 4,139,074 A | 2/1979 | White |
| 4,189,703 A | 2/1980 | Bennett |
| 4,196,688 A | 4/1980 | Lipinsky, Sr. |
| 4,231,111 A | 10/1980 | Neeley |
| 4,276,845 A | 7/1981 | Spanner |
| 4,290,123 A | 9/1981 | Pickens |
| 4,313,181 A | 1/1982 | Holm |
| 4,314,363 A | 2/1982 | Thigpen et al. |
| 4,354,446 A | 10/1982 | Goldsmith et al. |
| 4,372,420 A | 2/1983 | White |
| 4,404,664 A | 9/1983 | Zachariadis |
| 4,520,468 A | 5/1985 | Scherbatskoy |
| 4,566,083 A | 1/1986 | Thigpen |
| 4,570,245 A | 2/1986 | Thigpen |
| 4,581,723 A | 4/1986 | Savit |
| 4,616,348 A | 10/1986 | Ostrander |
| 4,616,590 A | 10/1986 | Albertini et al. |
| 4,621,347 A | 11/1986 | Ostrander |
| 4,648,083 A | 3/1987 | Giallorenzi |
| 4,669,067 A | 5/1987 | Roberts |
| 4,719,987 A | 1/1988 | George, Jr. et al. |
| 4,729,333 A | 3/1988 | Kirby et al. |
| 4,744,698 A | 5/1988 | Dallimer et al. |
| 4,756,268 A | 7/1988 | Gjestrum et al. |
| 4,775,028 A | 10/1988 | de Heering |
| 4,798,156 A | 1/1989 | Langeland et al. |
| 4,800,831 A | 1/1989 | Hellman et al. |
| 4,870,626 A | 9/1989 | Tveit |
| 4,992,991 A | 2/1991 | Young et al. |
| 4,998,227 A | 3/1991 | Rygg et al. |
| 5,046,055 A | 9/1991 | Ruffa |
| 5,097,788 A | 3/1992 | Castel |
| 5,113,376 A | 5/1992 | Bjerkoy |
| 5,142,505 A | 8/1992 | Peynaud |
| 5,144,588 A | 9/1992 | Johnston et al. |
| 5,157,636 A | 10/1992 | Bjerkoy |
| 5,263,431 A | 11/1993 | Wood |
| 5,305,703 A | 4/1994 | Korsgaard |
| 5,353,223 A | 10/1994 | Norton et al. |
| 5,408,441 A | 4/1995 | Barr et al. |
| 5,532,975 A | 7/1996 | Elholm |
| 5,666,900 A | 9/1997 | Carroll et al. |
| 5,676,083 A | 10/1997 | Korsgaard |
| 5,841,733 A | 11/1998 | Bouyoucos et al. |
| 5,941,746 A | 8/1999 | Isnard et al. |
| 6,012,406 A | 1/2000 | Dudley et al. |
| 6,021,577 A | 2/2000 | Shiells et al. |
| 6,046,959 A | 4/2000 | Salmi et al. |
| 6,058,072 A | 5/2000 | Abraham |
| 6,088,296 A | 7/2000 | Seaman et al. |
| 6,189,477 B1 | 2/2001 | Cody |
| 6,212,476 B1 | 4/2001 | Noy et al. |
| 6,227,310 B1 | 5/2001 | Jamieson |
| 6,467,423 B1 | 10/2002 | Poldervaart |
| 6,474,254 B1 | 11/2002 | Ambs et al. |
| 6,487,782 B1 | 12/2002 | Bond |
| 6,493,636 B1 | 12/2002 | DeKok |
| 6,504,792 B2 | 1/2003 | Barker |
| 6,525,992 B1 | 2/2003 | Olivier et al. |
| 6,532,189 B2 | 3/2003 | Barker |
| 6,606,958 B1 | 8/2003 | Bouyoucos |
| 6,683,819 B1 | 1/2004 | Estaphan et al. |
| 6,823,262 B2 | 11/2004 | Bahorich et al. |
| 7,042,803 B2 | 5/2006 | Kutty et al. |
| 7,092,315 B2 | 8/2006 | Olivier |
| 7,190,634 B2 | 3/2007 | Lambert et al. |
| 7,206,254 B2 | 4/2007 | Olivier et al. |
| 7,206,256 B1 | 4/2007 | Thornton et al. |
| 7,209,408 B1 | 4/2007 | Stottlemyer et al. |
| 7,221,623 B2 | 5/2007 | Thornton et al. |
| 7,222,579 B2 | 5/2007 | Hillesund et al. |
| 7,252,046 B1 | 8/2007 | Ead et al. |
| 7,293,520 B2 | 11/2007 | Hillesund et al. |
| 7,376,515 B2 | 5/2008 | Smith |
| 7,423,929 B1 | 9/2008 | Olivier |
| 7,457,193 B2 | 11/2008 | Pramik |
| 7,623,411 B2 | 11/2009 | Faucheaux et al. |
| 7,660,189 B2 | 2/2010 | Vigen et al. |
| 8,347,801 B2 | 1/2013 | Denise |
| 8,582,394 B2 | 11/2013 | Suedow et al. |
| 2002/0064092 A1 | 5/2002 | Nishimura |
| 2005/0180263 A1 | 8/2005 | Lambert et al. |
| 2006/0215489 A1 | 9/2006 | Solheim et al. |
| 2006/0239122 A1 | 10/2006 | Vigen et al. |
| 2006/0256653 A1 | 11/2006 | Toennessen et al. |
| 2006/0262647 A1 | 11/2006 | Thornton et al. |
| 2007/0070808 A1 | 3/2007 | Ray et al. |
| 2008/0141916 A1 | 6/2008 | Bein |
| 2008/0163504 A1 | 7/2008 | Smith et al. |
| 2008/0223583 A1 | 9/2008 | Roveri et al. |
| 2009/0141587 A1 | 6/2009 | Welker et al. |
| 2009/0141591 A1 | 6/2009 | Basilico |
| 2009/0161485 A1 | 6/2009 | Toennessen et al. |
| 2009/0245019 A1 | 10/2009 | Falkenberg et al. |
| 2009/0262601 A1 | 10/2009 | Hillesund et al. |
| 2009/0265111 A1 | 10/2009 | Helwig et al. |
| 2009/0296519 A1 | 12/2009 | Keers et al. |
| 2009/0316526 A1 | 12/2009 | Grail |
| 2010/0226204 A1 | 9/2010 | Gagliardi et al. |
| 2010/0312519 A1 | 12/2010 | Huang et al. |
| 2011/0013481 A1 | 1/2011 | Clark |
| 2011/0228636 A1 | 9/2011 | Kambiz et al. |
| 2012/0134234 A1 | 5/2012 | Roberts et al. |
| 2012/0230150 A1 | 9/2012 | Suedow et al. |
| 2013/0155807 A1 | 6/2013 | Suedow et al. |
| 2013/0182531 A1 | 7/2013 | Gagliardi et al. |
| 2014/0102347 A1 | 4/2014 | Gagliardi et al. |
| 2014/0104985 A1 | 4/2014 | Gagliardi et al. |
| 2014/0153360 A1 | 6/2014 | Tonhia |

FOREIGN PATENT DOCUMENTS

| | | |
|---|---|---|
| GB | 1376513 | 12/1974 |
| GB | 1415706 | 11/1975 |
| RU | 1835938 A1 | 4/1995 |
| RU | 13929 U1 | 6/2000 |
| RU | 65250 U1 | 7/2007 |
| RU | 2317572 C1 | 2/2008 |
| RU | 238802 C1 | 4/2010 |
| SU | 1125575 A1 | 11/1984 |
| SU | 1382736 A | 3/1988 |

(56) References Cited

FOREIGN PATENT DOCUMENTS

| SU | 1520459 A1 | 7/1989 |
| SU | 1744660 | 6/1992 |
| SU | 1835938 | 4/1995 |
| SU | 1835938 A1 | 4/1995 |
| WO | 2008/060719 | 5/2008 |
| WO | 2008140654 | 11/2008 |
| WO | 2009/045639 | 4/2009 |
| WO | 2012162310 A1 | 11/2012 |
| WO | 2013009245 A1 | 1/2013 |

OTHER PUBLICATIONS

First Examination Report in counterpart RU Appl. 2017105809, dated Feb. 22, 2018, 19-pgs.
Int'l Search Report and Written Opinion in counterpart PCT Appl. PCT/2015/041954, dated Jan. 12, 2016, 15-pgs.
Second Examination Report in counterpart DK Appl. PA 2017 70138, dated May 15, 2018, 4-pgs.
Third Examination Report in counterpart DK Appl. PA 2017 70138, dated Nov. 15, 2018, 4-pgs.
Decision on Grant in counterpart RU Appl. 2017105809, dated Jun. 26, 2018, 13-pgs.
First Office Action in counterpart CA Appl. 2956220, dated Oct. 24, 2018, 6-pgs.
Fourth Examination Report in counterpart DK Appl. PA 2017 70138, dated Jun. 13, 2019, 2-pgs.
First Examination Report in counterpart UK Appl. GB1701157.8, dated May 14, 2019, 5-pgs.

MARINE SEISMIC SURVEYING WITH TOWED COMPONENTS BELOW WATER'S SURFACE

CROSS-REFERENCE TO RELATED APPLICATIONS

This is a continuation of U.S. application Ser. No. 14/339,726, filed 24 Jul. 2014 and is a continuation of U.S. application Ser. No. 14/216,935, filed 17 Mar. 2014, which are both incorporated herein by reference in their entireties.

BACKGROUND

Conventional marine seismic surveying uses a seismic source and a number of streamers towed behind a seismic survey vessel. These streamers have sensors that detect seismic energy for imaging the formations under the seafloor. Deploying the streamers and sources and towing them during a survey can be relatively straightforward when operating in open waters with moderate swells or the like.

Marine locations covered by ice, debris, large swells, or other obstacles can make surveying more difficult, expensive, or even impossible. In icy waters, for example, the seismic survey vessel must break through ice and traverse waters filled with ice floes. The noise generated by ice impacts can complicate the seismic record produced.

Additionally, the ice floes on the water's surface make towing the source and streamers more difficult and prone to damage. For example, any components of the system at the water's surface can encounter ice, become bogged down, and lost. In addition, any cables or towlines coming off the vessel even from slipways can collect ice at the surface. Likewise, ice pulled under the hull and rising behind the vessel can shear away these cables and lines.

Some approaches for performing seismic surveys in icy regions known in the art are disclosed in U.S. Pat. Nos. 5,113,376 and 5,157,636 to Bjerkoy. To date, however, the problems associated with marine seismic surveying in icy or obstructed waters have not been significantly addressed.

The subject matter of the present disclosure is directed to overcoming, or at least reducing the effects of, one or more of the problems set forth above.

SUMMARY OF THE DISCLOSURE

In embodiments disclosed herein, a marine surveying apparatus for a vessel has towed components for obtaining seismic data. The towed components towed by the vessel are submerged at a first level below the surface of the water.

In particular embodiments of the apparatus, the towed components can include a 3D spread of seismic streamers and source(s) that are neutrally buoyant to be towed below the surface of the water during survey operations. For example, the towed components can include a float submerged below the surface of the water and supporting the at least one towed component. The float has preconfigured buoyancy so that the towed component can be towed at the desired depth under the water's surface. To configure the buoyancy for the characteristics of the implementation (e.g., tow speed, depth, weight of component, etc.), the float can use buoyant inserts and neutral spacers disposed in a hollow of the float to configuring the buoyancy of the float.

The towed components can include a streamer towed by the vessel and supported by the float. Such a streamer typically has one or more sensors for sensing a seismic signal. The towed component can also include a paravane towed by the vessel and supported by the float. The paravane is typically coupled to one or more additional towed components.

In particular embodiments disclosed herein, a marine surveying vessel is used for towing the towed components of the seismic equipment with one or more cable or lines. The vessel has one or more skegs mounted on the vessel and extending at least below a waterline of the vessel. For example, the skeg can mount on a stern of the vessel, and a distal end of the skeg can extend below the stern to at least a keel of the vessel.

The skeg has one or more shuttles movable along the skeg, and each of the one or more shuttles in turn has one or more tow points disposed on the shuttle and movable along the skeg therewith. The one or more tow points support the one or more cables for towing the seismic equipment behind the vessel and below the water's surface.

To guide the shuttle, the skeg can have a rail extending along the skeg, and pulleys can move the shuttle along the first skeg. In addition to having shuttles, the skeg defines a passage extending at least below the waterline of the vessel. The passage protects the one or more cables of the seismic equipment passing from the vessel to below the waterline.

The foregoing summary is not intended to summarize each potential embodiment or every aspect of the present disclosure.

DETAILED DESCRIPTION

A. Marine Seismic Survey System

Figure 1A:
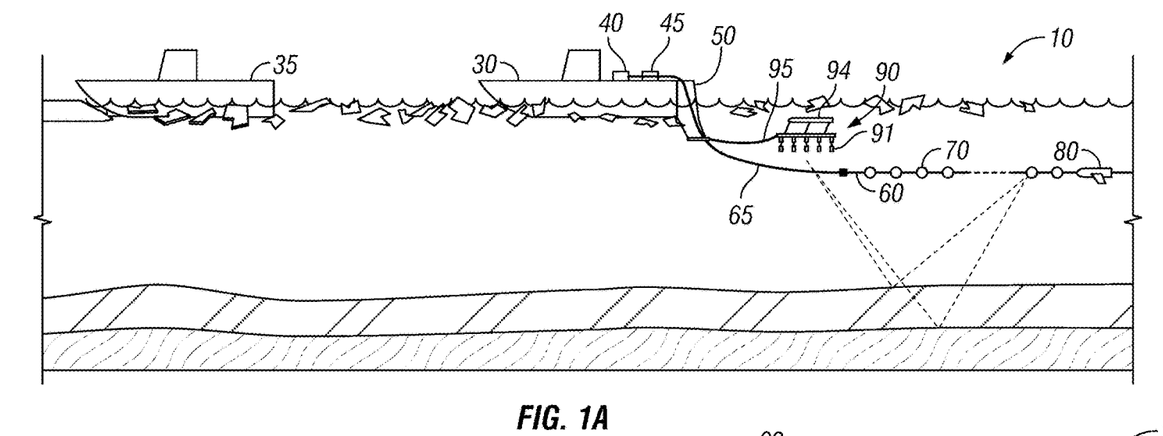
FIGS. 1A-1B show side and plan views of a marine seismic survey system according to certain teachings of the present disclosure.
Figure 1B:
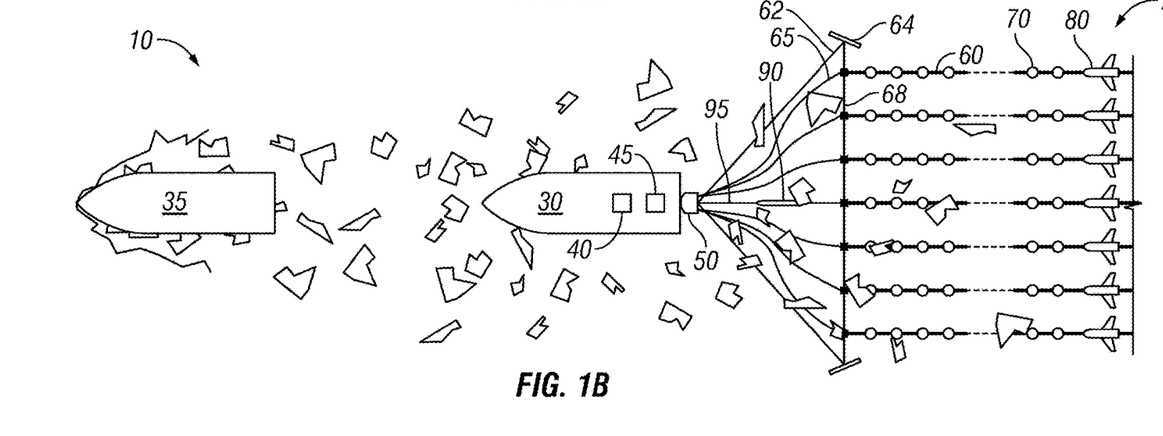

A marine seismic survey system 10 in FIGS. 1A-1B can be used in icy regions having glacial ice, pack ice, and ice floes. However, elements of the system 10 can be used in other locations having debris, plants, flotsam, jetsam, or other obstructions or obstacles at the water's surface that can interfere with towed components of the marine seismic survey system. In fact, this system 10 and others disclosed herein can be used in any environment—not just those prone to physical obstructions or obstacles, such as ice. For example, weather, large swells, noise, conventional hazards, and even normal conditions encountered in marine seismic surveys can benefit from the systems of the present disclosure. Accordingly, reference to icy or obstructed waters in the present disclosure is meant to be illustrative.

In icy regions, for example, the system 10 preferably includes an icebreaker vessel 35 that breaks ice in advance of a tow vessel 30. In operation, the icebreaker vessel 35 breaks pack ice and diverts ice floes to create a tract for passage of the tow vessel 30. As the tow vessel 30 tows one or more streamers 60, a supply system 45 operates a source 90, and a control system 40 having a seismic recorder that records the seismic data obtained with sensors 70 on the streamers 60.

Because the tow vessel 30 operates in icy or obstructed waters or even when the tow vessel 30 operates under normal conditions in typical waters, a protective device 50 on the tow vessel 30 couples to towlines 62 and couples to the lead-in cables 65 and umbilical cables 95 that support the streamers 60 and sources 90. (Although multiple streamers 60 are shown, the system 10 can have one steamer 60 if desired). As discussed below, the protective device 50 (referred to herein as a skeg) keeps towlines and cables for the towed components away from the water's surface, which can have ice floes for icy regions, other obstacles in other regions, or the like, for example. The skeg 50 allows the vessel 30 to tow the streamers 60 while handling various loads caused by motions of the vessel 30, forces from the towed bodies, and interactions with the possible ice, waves, or other impediments.

In general, the skeg 50 can be located anywhere on the vessel 30. As best shown in FIG. 1A, however, the skeg 50 preferably extends from the vessel's hull at the stern. This abaft position is better suited for deploying cables, towlines, and other components of the marine seismic survey system being towed by the vessel 30. In one arrangement, the skeg 50 is a static addition to the vessel 30 that can be welded, incorporated, or otherwise attached in a shipyard to an existing design of a vessel's hull. Alternatively, the vessel 30 can be predesigned and built with an appropriate skeg 50 incorporated into its hull design, or the skeg 50 may be a deployable component provided with appropriate mechanisms for deploying and holding it on the vessel 30. In yet another arrangement, the skeg 50 can be a portable or independent component that can be mounted temporarily on the side of the vessel without the need for modifying the vessel's hull.

Extending below the vessel's waterline, the skeg 50 keeps the attachment points for towlines (e.g., 62), lead-in cables 65, umbilical cables 95, etc. below the surface of the water. This keeps the towlines 62 and cables 65, 95 below the water's surface and away from any issues (e.g., any ice floes floating on the water's surface that could interfere with or collect around the towlines 62, lead-in cables 65, umbilical cables 95, etc.). The lead-in cables 65 connected to the seismic recorder of the control system 40 extend from the vessel 30, and the skeg 50 directs these streamer lead-in cables 65 below the water's surface (e.g., so that ice will not interfere with or collect around them). For icy or obstructed regions, the depth required to effectively hold the streamer lead-in cables 65 and the connected streamers 60 below any ice level can be depend on the particular implementation. As one example, the skeg 50 may extend about 7-m below the vessel 30's waterline. However, this distance can vary for a given implementation, depending on the type of ice regime in which the vessel is operating, the size of the vessel, and other factors.

In the present arrangement, a seismic source 90 suspends horizontally in the water column behind the vessel 30 and has a plurality of seismic source elements 91, which are typically air guns. (Although one source 90 is shown, the system 10 can use multiple sources.) A supply or umbilical cable 95 connected to the supply system 45 extends from the vessel 30, and the skeg 50 also directs this umbilical cable 95 below the water's surface so it is out of the way of ice, obstacles, waves, swells, and the like as well. A towline (not shown) may connect the umbilical cable 95 to the skeg 50 to help tow the source 90 behind the vessel 30.

The umbilical cable 95 is preferably neutrally buoyant, and the source 90 can be stabilized by one or more flotation devices or buoys 94. For icy regions, because ice moves along the surface of the water, the flotation device 94 can be designed to handle interactions with ice as it floats at the surface. Accordingly, the flotation device 94 can be shaped to minimize impacts with ice or other obstacles and can be arranged horizontally to cut through any ice floes or obstructions at the surface. Preferably, however, the flotation device 94 is designed to avoid contact with ice or other obstacles by floating below the surface, as discussed in more detail later.

To tow the horizontal source 90 behind the vessel 30, a towline (not shown) may be used to secure to the skeg 50 under the water and to connect to the source 90 suspended below the water's surface. One or more support lines interconnect the flotation device 94 with the source 90. The umbilical cable 95 extends off the end of the vessel 30, fits through a channel in the skeg 50, and connects to the source 90 for operation.

In general, the towlines 62, streamers 60, sensors 70, cables 65/95, control system 40, and supply system 45 can be conventional components known and used in marine seismic surveying. For example, the source elements 91 can be operated in any conventional manner to create a suitable seismic source signal. In addition, the streamers 60 can use neutrally buoyant cables used for supporting appropriate marine seismic sensors 70. As such, each streamer 60 can have several sections with each having an outer skin to protect the interior from water and having axial members along its length for axial strength. Each section of the streamer 60 can also have a wire bundle that carries electrical power and data communication wires. For their part, the sensors 70 are typically hydrophones located within the streamer 60.

As further shown in FIG. 1B, paravanes, fins, or doors 64 and spreader ropes 68 can be used to support multiple streamers 60 in a 3-D spread 20 behind the tow vessel 30. These paravanes 64 and spreader ropes 68 can also be similar to conventional components used for marine seismic surveying, except that the paravanes 64 preferably tow under the water's surface as discussed later. Finally, the streamers 60 can include control devices 80 disposed thereon—i.e., along their length and/or at their distal ends. These control devices 80 can include tail drogues, birds, vanes, controllable vehicles, and the like as disclosed herein and in the incorporated parent applications.

Because the towing vessel 30 tows the seismic spread 20 in icy or obstructed waters, deployment of the seismic survey components preferably accounts for possible issues with ice floes and the like that can hinder the deployment and retrieval of the streamers 60 and sources 90. Deployment and retrieval of the system may be performed when the towing vessel 30 is away from significant ice. For example, the seismic system can be deployed normally before putting cables into the skeg 100 and submerging the various components.

In a typical implementation, the streamers 60 can be several kilometers in length, and deploying the seismic system in a clearing may require a significant area that may not always be available in icy regions. Therefore, it is desirable to be able to deploy/retrieve the disclosed seismic systems in other areas of an icy region, including those having ice.

The vessel 30 may break the ice and/or push ice floes out of the way as it travels so that a narrow deployment area lies in its wake where ice may be relatively absent. Of course, this depends on how tightly the ice is packed and how it might be traveling. When conditions permit, it is preferred to be able to deploy and retrieve the streamers 60 of an array in such a cleared area. Therefore, the deployment and retrieval techniques for surveying in icy waters preferably take advantage of this potentially cleared area. The examples below discuss several forms of seismic arrays that can be deployed and retrieved in such an area.

In FIG. 1B, the seismic array or spread 20 uses towlines and streamer lead-in cables 65 connected from the skeg 50 on the vessel 30 to head floats 350. Spreader ropes 68 connect across the head floats 350, and tow lines 62 are deployed with paravanes 64 on the end.

Although one skeg 50 is shown in the arrangements of FIG. 1B, it is possible for the vessel 30 to use multiple skegs 50 on the vessel 30 to deploy the streamers 60. Using the multiple skegs 50 can help in the deployment and retrieval of the streamers 60 by dividing them up in their arrangement. Although the arrangements in FIGS. 1A-1B and elsewhere show a single source, multiple sources could be used. Moreover, one source can be towed in a conventional location behind the vessel 30, while another source can towed behind the splayed array of the steamers 60. This second source can be used to obtain a reverse reading from the steamers 60, which can be advantageous for data acquisition and analysis.

During marine seismic surveying, it is desirable to determine, track, and potentially control the positions of the streamers 60 and the source 90 to better acquire and map the seismic data obtained. Determining position can be done using GPS readings of the streamers 60 during the survey. This can be done in some cases, but in other cases obtaining GPS readings for the locations of the streamers 60 may not be feasible.

In the marine seismic surface systems 10 of the present disclosure, for example, obtaining GPS readings can prove difficult because the system 10 is significantly submerged below the water's surface so that GPS receivers cannot operate to obtain readings. Several types of deployed or controllable device 80 can be used on the streamers to obtain GPS readings and otherwise control the position of the streamers during surveying. These are disclosed in the incorporated patent applications. In other techniques, the seismic survey can be conducted in an open traverse without obtaining GPS readings of the streamers 60. These techniques are also disclosed in the incorporated applications. The details related to both of these techniques are not repeated herein for the purposes of brevity.

With an understanding of the disclosed system 10, discussion now turns to particular components of the system, starting with the skeg.

B. Skeg Designs

Figure 2A:
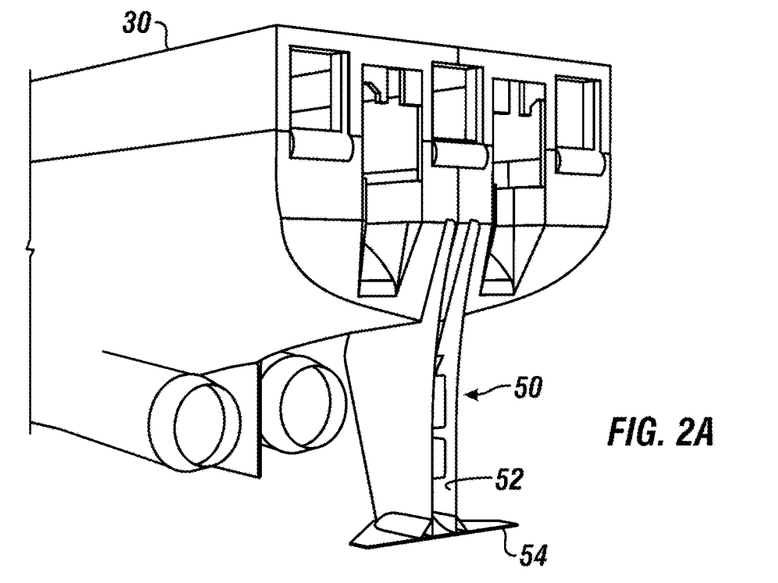
FIGS. 2A-2D show an aft view of a vessel having different embodiments of skegs for towing an array of seismic streamers and a source of the disclosed marine seismic survey system.
Figure 2B:
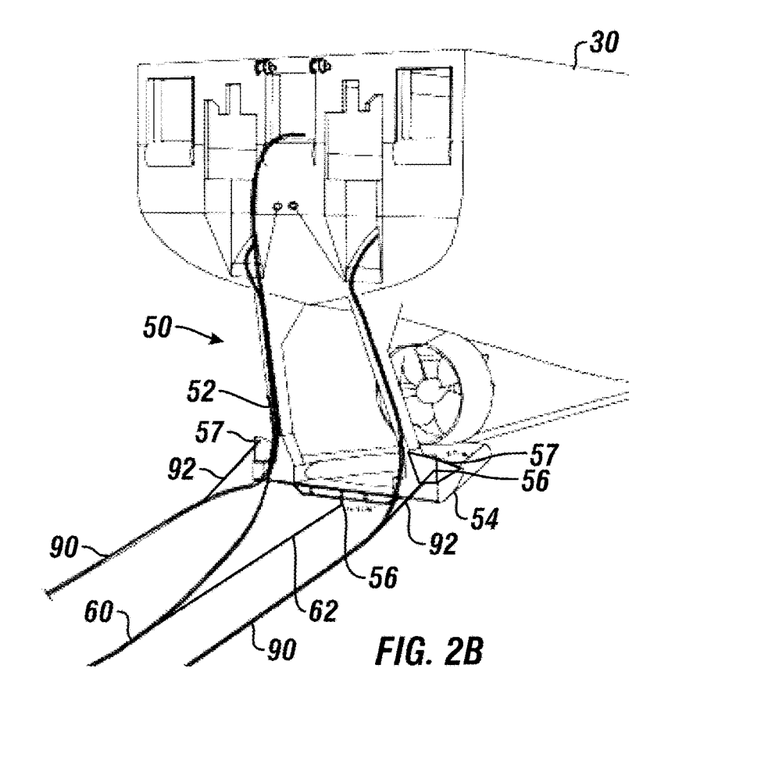

As discussed above, the tow vessel 30 uses the skeg 50 to keep the towlines 62 and cables 65/95 below the water's surface (e.g., away from ice floes or the like). The ice skeg 50 can have different configurations. As shown, for example, in FIG. 2A of incorporated U.S. application Ser. No. 14/216, 935 filed 17 Mar. 2014, the ice skeg 50 can have a single protective passage 52 (FIG. 2A). The passage 52 is used to provide protection for the umbilicals and the lead-in cables 65 and 95 for the streamers 60 and sources 90. In FIG. 2B of incorporated U.S. application Ser. No. 14/216,935 filed 17 Mar. 2014, the skeg 50 has multiple protective passages 52. This set up allows for full rudder performance and can help maintain the maneuverability of the survey vessel 30. Additionally, this skeg 50 in FIG. 2B can use one or more shuttle(s) 57 that can be run up and down in the skeg 50 to raise and lower the tow points 56 with each shuttle 57 being able to handle one or more tow lines for the streamers 60 and/or sources 90.

Either way, the ice skeg 50 has a base or distal end 54 providing subsea tow points 56 for the in-water equipment. Towlines 62 and 92 for the system's streamers 60 and sources 90 connect to these tow points 56. In this way, these towlines 62 and 92 deploy under the water and away from any ice floes that may be present at the water's surface. Additionally, this helps maintain the towed equipment (60, 90) below the ice and facilitates maintaining an optimum depth.

In one arrangement, the ice skeg 50 provides at least three subsea tow points 56—one on the centerline and two other winch controlled tow points. These two outer tow points 56 can be several meters to port and starboard respectively. The tow weight of the streamer 60 and air gun sources 90 can be borne by the tow lines 62 and 92 connected to these tow points 56 while the cables 65 and 95 are stowed in the passage(s) 52 of the ice skeg 50.

Various procedures are used for operations using the ice skeg 50 along with procedures for deployment and retrieval of streamers 60 and sources 90. In general, cables from tugger winches provided on the deck of the vessel 30 are used to pull the umbilicals and the lead-in cables 65 and 95 in to the protective passage(s) 52 behind the skeg 50.

Figure 2C:
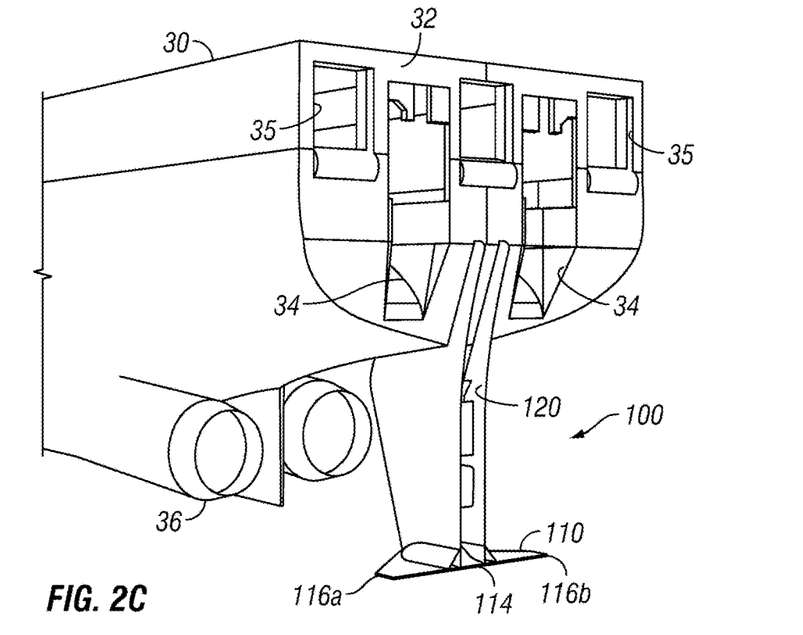

As shown in FIG. 2C of incorporated U.S. application Ser. No. 14/339,726, filed 24 Jul. 2014, one embodiment of a skeg 100 mounts onto the aft or stern 32 of the seismic tow vessel 30 used to tow seismic streamers (not shown). As noted previously, the skeg 100 can mount anywhere on the vessel 30, including the port, starboard, bow, or through a moon pool in the hull. However, the stern or aft 32 of the vessel 30 is preferred because the streamers (not shown) are best towed behind the vessel 30, which can help break waves, ice floes, or the like while towing the streamers.

In this embodiment, the skeg 100 is a single conduit extending from the aft 32 of the vessel 30. So as not to interfere significantly with the vessel's steering and other functions, this single conduit skeg 100 is preferably used on a vessel 30 having dual screws 36, although it could be used with other types of vessels. The skeg 100 extends under the hull between slipways 34 used for deploying and retrieving steamers and cables. Along its after or trailing edge, the skeg 100 defines an open passage or channel 120 for passage of steamer cables, source cables, and slack lines as discussed later.

Even though the skeg 100 extends off the aft 32, ice may be forced to flow along the bottom of the vessel's hull when surveying in icy waters. This forced ice eventually reaches the aft 32 of the vessel 30 where it again resurfaces. In other situations, ice impacted by the bow of the vessel 30 may be forced under the vessel's hull and then attempt to resurface toward its aft 32 as the vessel 30 travels forward. In any event, the skeg 100 acts as a protective conduit to keep the towlines, cables, and the like away from this ice.

At its distal end, the skeg 100 may have a base or plate 110 that provides attachment points 114/116a-b for the towlines. In this way, the skeg 100 provides tow points 114/116a-b below the water's surface (and away from the ice floes at the surface). In addition to remaining protected, these undersurface tow points 114/116a-b also help maintain the streamers and source below the surface.

The previously described skeg 100 provides a single conduit down the center of the vessel's aft 32, which may be best suited for a vessel 30 with dual screws 36. As an alternative, a skeg 100 in FIG. 2D of incorporated U.S. application Ser. No. 14/339,726, filed 24 Jul. 2014 provides two or more conduits or passages 120 down a vessel's aft 32 and can be used with a vessel 30 having one or two screws 36 and one or two rudders 37.

Figure 2D:
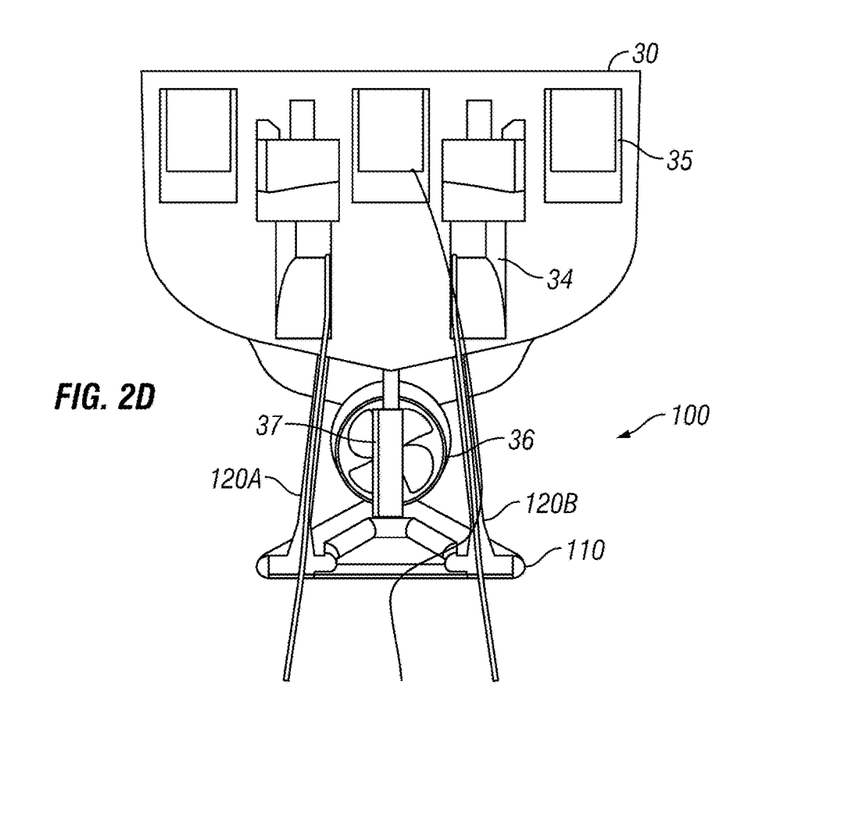

The dual channels 120A-B pass from the aft 32 of the vessel 30 and under the surface of the water on either side of the vessel's screw 36. In this way, the wake of the screw 36 and the rudder 34 of the vessel 30 can remain relatively unobstructed in the open space between the channels 120A-B.

The base plate 110 at its front end connects to the keel of the vessel 30. As with previous designs, the base plate 110 has tow points for attachment of towlines used to support the streamers and source of the seismic system. For example, these tow points can lie along the tailing edge of the plate 110. In addition, attachment points for the cables in the channels 120A-B are also provided on the trailing edge of the plate 110.

In previous examples, the skeg has tow points that are fixed. As an alternative, the skeg 100 has adjustable tow points for the connection of tow lines.

Figure 3A:
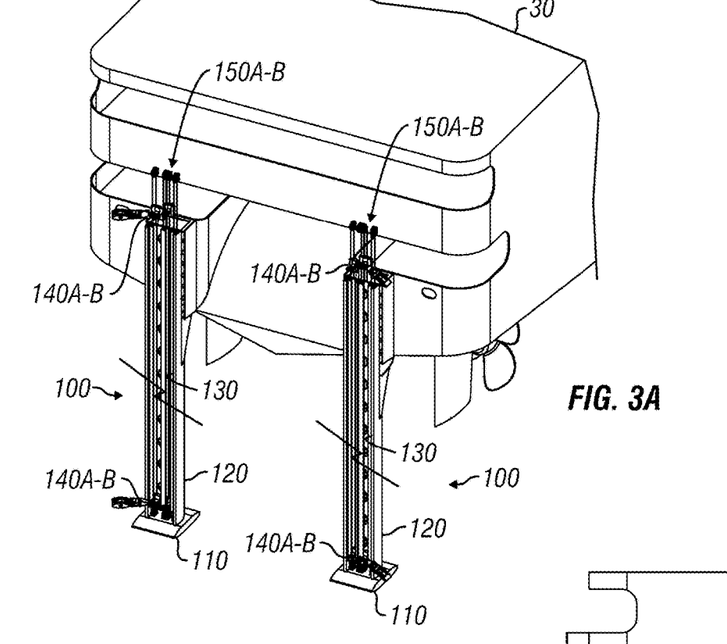
FIGS. 3A-3B show a stern of a vessel having another embodiment of a skeg with movable shuttles for adjusting tow points.
Figure 3B:
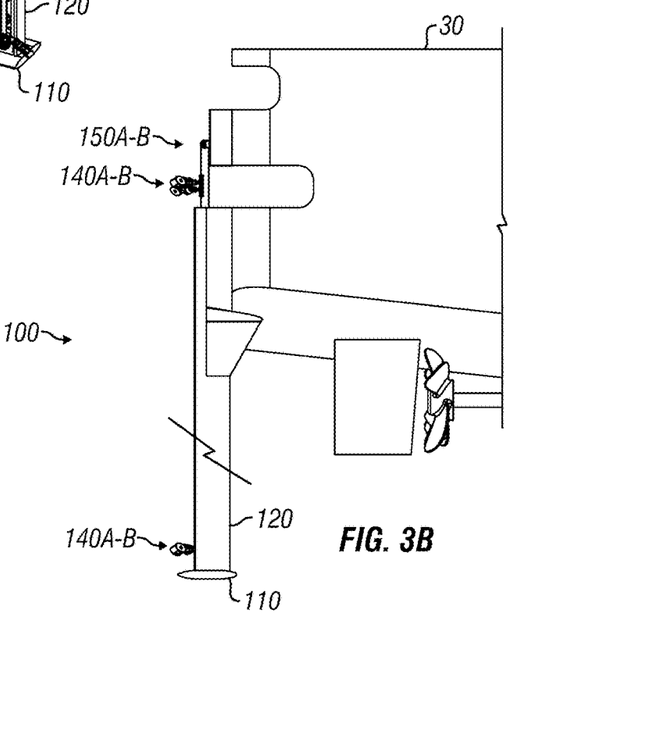

FIGS. 3A-3B of incorporated U.S. application Ser. No. 14/339,726, filed 24 Jul. 2014 show another vessel 30 according to the present disclosure having one or more skegs 100 extending from its aft as before. Here, two skegs 100 are shown (one port side and another starboard side), but more or less can be used. These skegs 100 also have adjustable tow points.

Each skeg 100 includes a conduit 120 for passage of lead-in lines for streamers and source cables (not shown). Moveable over or along these conduits 120, each of the skegs 100 has one or more shuttles or elevators 140A-B, which can have one or more tow points 142. The one or more shuttles 140A-B can be moved up and down the conduits 120 using pulley systems 150A-B to raise and lower the shuttles 140A-B and their tow points 142.

As noted before, the skegs 100 protect the seismic gear to get it under the water's surface (e.g., where ice is located). Additionally, the skegs 100 help move the tow points 142 for the seismic spread (20) to a desired depth at or below the vessel's keel. The shuttles 140A-B can give the spread (20) of the seismic system more stability and can allow the tow points 142 for the streamers, sources, and other cables to be at or near the desired towing depth of the system under the surface of the water.

In FIGS. 3A-3B, the skegs 100 each have two shuttles 140A-B that can be independently moved up and down along rails 130 disposed on the conduits 120. Each shuttle 140A-B has one or more tow points 142, which can include eyelets, pulleys, or other connectors for connection to towlines (not shown) and the like of the seismic system to be deployed, towed, and retrieved from the vessel 30.

For illustrative purposes, the shuttles 140A-B are shown in two extreme positions—one upward position toward the vessel's deck and another downward position toward the skeg's base 110. In reality, each skeg 100 may have only one set of shuttles 140A-B that can be moved by the pulley systems 150A-B between these upward and downward positions. However, in other arrangements, each pulley system 150A-B can be used to move multiple ones of the shuttles 140 or larger shuttles 140 along the rails 130.

Figure 3C:
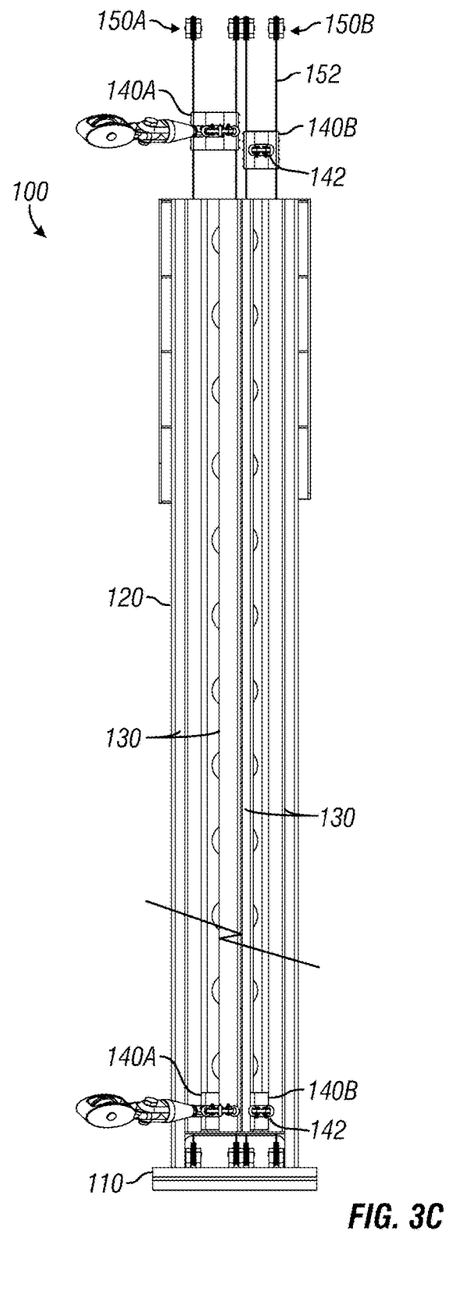
FIG. 3C shows the skeg having adjacent shuttles.
Figure 3D:
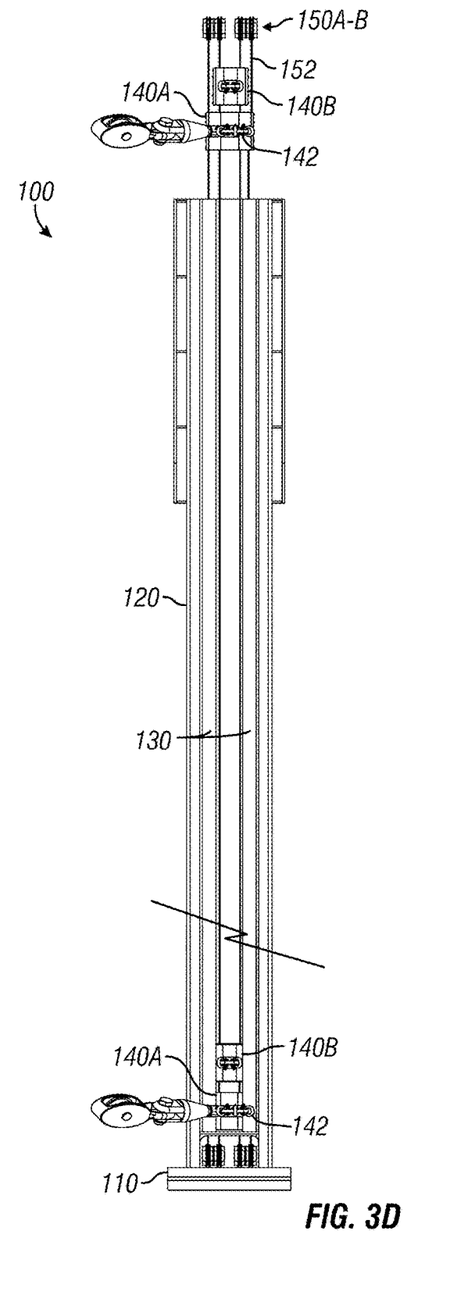
FIG. 3D shows the skeg having stacked shuttles.

In FIG. 3C, the skeg 100 is shown with the shuttles 140A-B set side-by-side so they can be moved with respect to one another by adjacent pulley systems 150A-B. In FIG. 3D, the shuttles 140A-B are stacked on the skeg 100 and can be moved with respect to one another by inner and outer pulley systems 150A-B.

The shuttles 140A-B on the skegs 100 of FIGS. 3A-3D allow operators to recover streamers and sources separately and/or independently. Retrieving the lower stacked shuttle 140A and its connected tow lines in FIG. 3D requires concurrent retrieval of the other stacked shuttle 140B, even though the shuttles 140A-B can be moved separately. Deployment of these shuttles 140A-B in FIG. 3D can be stacked or concurrent. By contrast, the adjacent shuttles 140A-B in FIG. 3C can be moved separately and can be deployed and retrieved independently, which can have a number of advantages in the field.

Figure 4A:
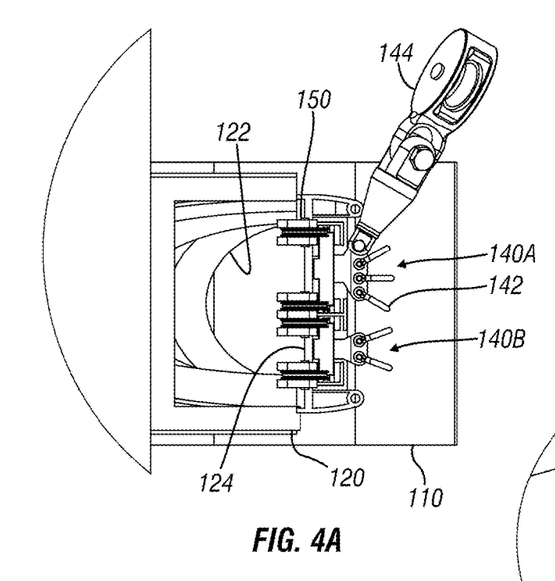
FIG. 4A shows a top view of the skeg of FIG. 3C.
Figure 4B:
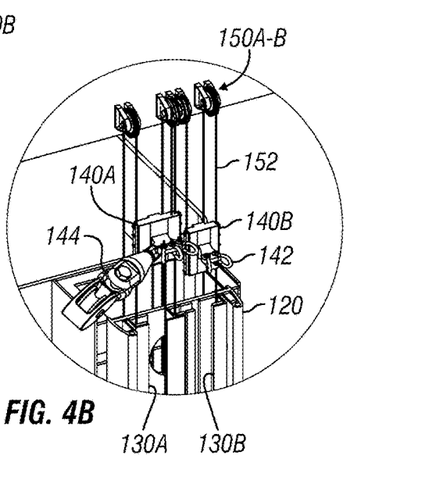
FIG. 4B shows a detailed view of the pulley systems for the skeg of FIG. 3C.
Figure 4C:
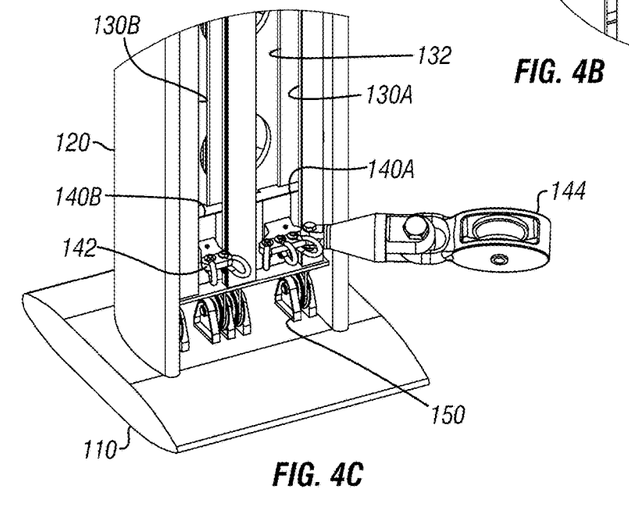
FIG. 4C shows a detailed view of the distal end of the skeg of FIG. 3C.

Turning to FIG. 4A-4C, additional details of the skeg 100 as in FIG. 3C are disclosed. FIG. 4A shows a top view of the skeg 100 having the adjacent shuttles 140A-B, FIG. 4B shows a detailed view of the pulley systems 150A-B, and FIG. 4C shows a detailed view of the end of the skeg 100. Although these details are provided for the skeg 100 as in FIG. 3C, similar details would pertain to the skeg 100 of FIG. 3D.

Each shuttle 140A-B is moved by its respective pulley system 150A-B, and the shuttles 140A-B move over the conduit's passage 122, which is separated from the shuttles' track by a separation or wall 124. One shuttle 140A may be larger than the other shuttle 140B and may have more tow points 142, although other configurations can be used. For instance, the inboard shuttle 140B mounted on the inboard side of the skeg 100 can be used to tow the sources. The outboard shuttle 140A mounted on the outboard side of the skeg 100 can be used to tow the streamers and paravanes. For the paravane's tow ropes and other outboard towing, the tow point 142 can use a swivel and pulley assembly 144.

As shown in FIGS. 4B-4C, the pulley systems 150A-B use upper and lower sheaves and steel cables. The upper sheaves can use motors (not shown) to move the cables and shuttles 140A-B. To facilitate movement of the shuttles 140A-B along the rails 130, low friction bars 132 composed of nylon or the like can be set on both sides of the shuttle 140A-B.

While the shuttles 140A-B are raised and lowered or set in position on the skeg 100, the edges of the rails 130 hold the shuttles 140A-B and provide horizontal support for the towlines of the seismic system behind the vessel 30. If desired, additional lock or brake features can be used to fix the shuttles 140A-B vertically in the rails 130. Locking of the pulley systems 150A-B can also hold the shuttles 140A-B vertically in place during operations.

The foregoing description of preferred and other embodiments is not intended to limit or restrict the scope or applicability of the inventive concepts conceived of by the Applicants. The teachings of the present disclosure can apply to 2-D, 3-D, and 4-D seismic surveying in icy or obstructed waters, as well under normal marine seismic conditions. In fact, the teachings of the present disclosure can be used in any environment—not just those prone to physical obstructions or obstacles. For example, weather, large swells, noise, any conventional hazards, and even normal conditions encountered in marine seismic surveys can benefit from the systems of the present disclosure.

Moreover, aspects and techniques discussed in conjunction with one particular embodiment, implementation, or arrangement disclosed herein can be used or combined with aspect and techniques discussed in others disclosed herein. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A marine surveying vessel for towing seismic equipment with one or more cables, the vessel comprising:
   at least one skeg mounted on the vessel and extending at least below a waterline of the vessel;
   at least one shuttle movable along the at least one skeg; and
   at least one tow point disposed on the at least one shuttle and movable along the at least one skeg therewith, the at least one tow point supporting at least one of the one or more cables below the surface of the water.

2. The vessel of claim 1, wherein the at least one skeg mounts on a stern of the vessel.

3. The vessel of claim 2, wherein a distal end of the at least one skeg extends below the stern to at least a keel of the vessel.

4. The vessel of claim 1, wherein the at least one skeg defines at least one passage extending at least below the waterline of the vessel, the at least one passage protecting the one or more cables of the seismic equipment passing from the vessel to below the waterline.

5. The vessel of claim 1, wherein the at least one skeg comprises a rail extending along the at least one skeg, the at least one shuttle being movable along the rail.

6. The vessel of claim 5, wherein the at least one shuttle movable along the rail adjusts a depth of the towed seismic equipment in the water.

7. The vessel of claim 1, wherein the at least one skeg comprises at least one pulley moving the at least one shuttle along the at least one skeg.

8. The vessel of claim 1, wherein the at least one shuttle comprises at least two shuttles movable along the at least one skeg, each of the at least two shuttles supporting at least one of the one or more cables.

9. The vessel of claim 8, wherein the at least two shuttles are movable together along the at least one skeg.

10. The vessel of claim 8, wherein the at least two shuttles are independently movable along the at least one skeg.

11. The vessel of claim 1, wherein the at least one tow point supports the at least one of the one or more cables with at least one towline coupled to the at least one tow point.

12. A marine surveying vessel for towing seismic equipment with one or more cables, the vessel comprising:
    at least one skeg mounted on the vessel and extending at least below a waterline of the vessel, the at least one skeg defining at least one passage extending at least below the waterline of the vessel, the at least one passage protecting the one or more cables of the seismic equipment passing from the vessel to below the waterline; and
    at least one shuttle movable along the at least one skeg adjacent the at least one passage and supporting at least one of the one or more cables below the surface of the water.

13. The vessel of claim 12, wherein the at least one skeg mounts on a stern of the vessel.

14. The vessel of claim 12, wherein a distal end of the at least one skeg extends below the stern to at least a keel of the vessel.

15. The vessel of claim 12, wherein the at least one skeg comprises a rail extending along the at least one skeg, the at least one shuttle being movable along the rail.

16. The vessel of claim 15, wherein the at least one shuttle movable along the rail adjusts a depth of the towed seismic equipment in the water.

17. The vessel of claim 12, wherein the at least one skeg comprises at least one pulley moving the at least one shuttle along the at least one skeg.

18. The vessel of claim 12, wherein the at least one shuttle comprises at least one tow point supporting the at least one of the one or more cables with at least one towline.

19. A marine surveying vessel for towing seismic equipment with one or more cables, the vessel comprising:
    at least one skeg mounted on the vessel and extending at least below a waterline of the vessel, the at least one skeg defining at least two passages extending at least below the waterline of the vessel, each of the at least two passages protecting the one or more cables of the seismic equipment passing from the vessel to below the waterline; and
    at least two shuttles movable along the at least one skeg, each of the at least two shuttles adjacent one of the at least two passages and supporting at least one of the one or more cables below the surface of the water.

20. The vessel of claim 19, wherein the at least two shuttles are movable together and/or independently along the at least one skeg.

* * * * *